United States Patent [19]

Taber et al.

[11] 4,437,313

[45] Mar. 20, 1984

[54] HRSG DAMPER CONTROL

[75] Inventors: Bruce D. Taber, Boxford; James B. Wagner, Malden, both of Mass.

[73] Assignee: General Electric Company, Lynn, Mass.

[21] Appl. No.: 319,436

[22] Filed: Nov. 9, 1981

[51] Int. Cl.³ ...................... F01K 13/02; F01K 23/06
[52] U.S. Cl. .................................. 60/665; 60/39.182; 60/646
[58] Field of Search ................. 60/646, 657, 660, 664, 60/665, 667, 39.182

[56] References Cited

U.S. PATENT DOCUMENTS 2,762,201 9/1956 Sampson ............................... 60/664
4,319,320 3/1982 Sato et al. ............................. 60/665

Primary Examiner—Allen M. Ostrager
Attorney, Agent, or Firm—James W. Mitchell

[57] ABSTRACT

A method of and apparatus for controlling a steam turbine system for a combined cycle power plant using measured parameters to control the position of dampers regulating heat flow to steam generating equipment so as to limit thermal stresses, drum level surge and to provide load-following capabilities.

10 Claims, 9 Drawing Figures

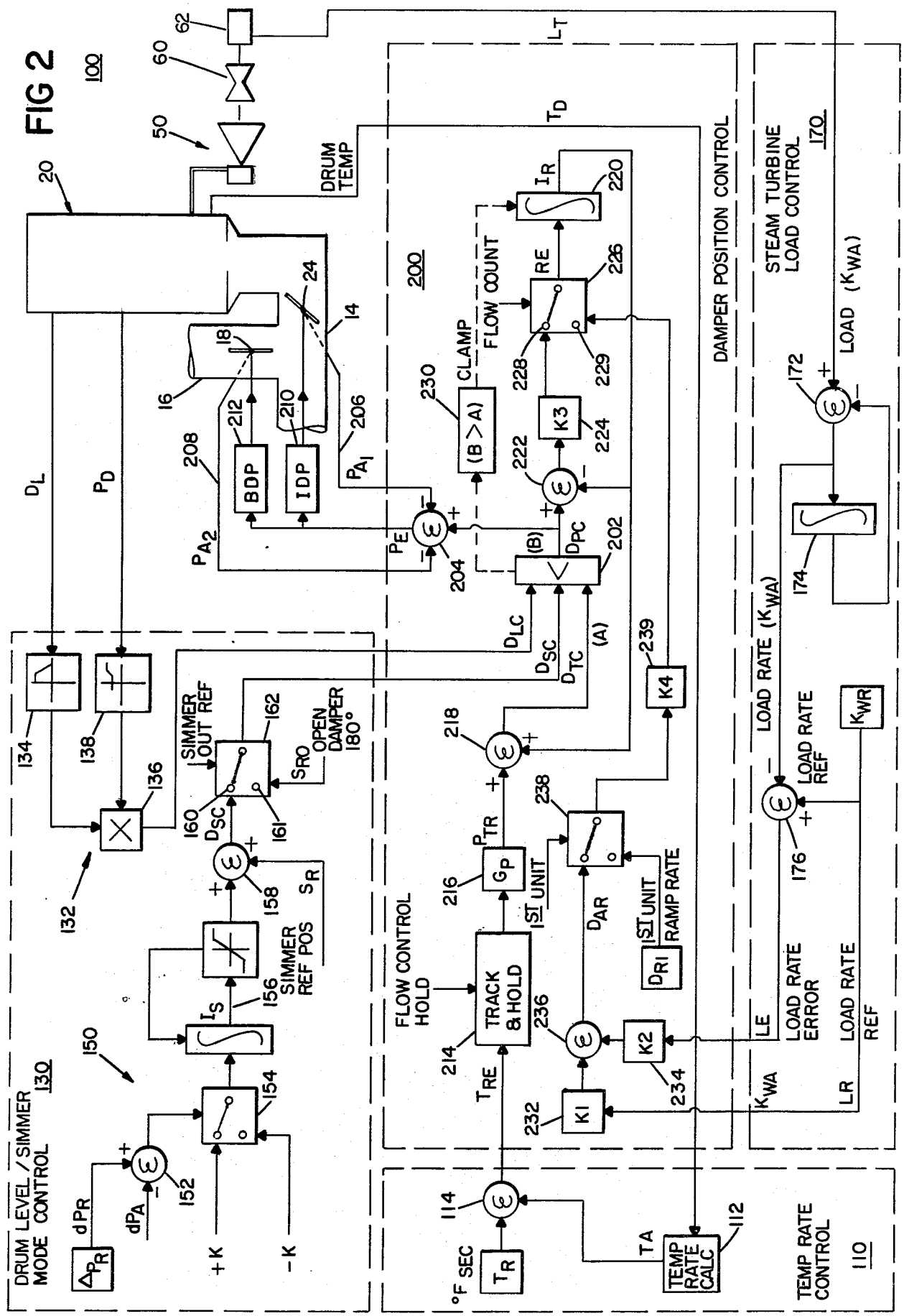

HRSG DAMPER CONTROL

FIELD OF THE INVENTION

This invention relates to a method and apparatus for controlling the operation of a steam turbine system for a combined cycle power plant, and in particular for regulating thermal stresses and drum surge, and for providing load-following, all by controlling the dampers feeding hot exhaust gas to heat recovery steam generators for the system.

BACKGROUND OF THE INVENTION

Combined cycle power plants, which are well known in the art, generate electricity by using both gas turbines and a steam turbine. The gas turbines operate in a conventional manner, but what would otherwise be the wasted, hot exhaust gas from the gas turbines is used by at least one and usually more heat recovery steam generators (hereinafter "HRSG") to produce steam to run the steam turbine. As a result, a generator driven by the steam turbine produces additional electricity without the expenditure of any additional fossil fuel, unless some small amount is used for the supplementary heating of the exhaust gas prior to its reaching the HRSGs. Such plants and the general control systems therefor are described in Baker et al. U.S. Pat. No. 3,879,616 and in Wagner et al. U.S. patent application Ser. No. 187,153 now U.S. Pat. No. 4,329,592, filed Sept. 15, 1980, both assigned to the same assignee as this application and both incorporated herein by reference.

Maximum plant output is achieved under steam and gas operation which normally occurs during the day. For the usual low demand periods, e.g., nighttime, the steam turbine system may be shut down, and the plant run in a simple cycle mode with only the gas turbines operating. Thus, the daily cyclic operation of the steam turbine system may involve starting some or all of the HRSGs and the steam turbine from either a cold state or some intermediate state of readiness. As a result, this daily start-up necessarily subjects the HRSGs, the steam turbine and related equipment to large thermal gradients which induce substantial mechanical stresses. As these thermal stresses can severely reduce the useful life of the components, the prior art control systems for the combined cycle plants reduce the thermal gradients as much as possible by using a very gradual start-up for the steam turbine system. It is, however, much more efficient if the start-up is rapid, thereby putting the steam turbine on-line as quickly as possible.

In addition to the thermal stress problem, start-up time is often lengthened by certain transient conditions, one of the most critical of which involves steam drum water level control. Each HRSG has a steam drum which is connected to an evaporator, which is heated by the exhaust gas. Under normal operating conditions, the evaporator continuously feeds both water and steam to the drum. At start-up, however, the evaporator only contains water, and initial boiling may occur at different places in the evaporator, forcing large slugs of water into the drum. The sudeen increase in drum water, or drum level surge, is undesirable as it may force water into a steam super-heater and the steam lines. Thus, in the prior art, the boiling is done very slowly, and the water level in the drum is maintained by dumping water through motor-operated drain valves. The latter is an additional drawback in that in correcting drum level surge problems large quantities of the expensive, chemically-treated water are lost.

Finally, while the HRSG is being brought on-line, it is desirable to generate steam at a rate which is compatible with the load rate limitations of the steam turbine. The prior art controls, however, do not do this.

Accordingly, one object of the present invention is to provide an improved control system for the steam turbine system of a combined cycle plant, which control system will permit rapid start-up of the plant while automatically limiting thermal stresses and compensating for transient start-up conditions.

Another object of the present invention is to provide such a control system which will automatically vary the rate of steam generation to produce the desired steam turbine loading rate.

Other objects, advantages, and features of the present invention will become apparent from the following description of the preferred embodiment taken together with the drawings and claims.

SUMMARY OF THE INVENTION

We have discovered that an improved control system for the steam turbine system for a combined cycle power plant can be made by using a number of measured parameters to adjust the position of the isolation and bypass dampers, which determine the amount of exhaust gas fed to the HRSGs, and thereby regulate thermal stresses, drum surge, steam flow and pressure, while at the same time automatically allowing rapid start-up and load-following.

In the preferred embodiment, the positioning of the isolation and bypass dampers is controlled by several subsystems through a least value gate. Each HRSG has its own dampers and control system. The first control subsystem is a temperature rate controller. Initially, the steam drum water temperature is measured, and based on its value, a reference rate of temperature increase is selected. The reference rate is at or below the maximum rate at which the temperature can increase without causing undue thermal stress, and it is computed from a cyclic damage curve. The damper is opened thereby heating the HRSGs, and the drum and water temperature rises. The actual water temperature is continually monitored as it increases, and an actual temperature rate of change is computed. This actual rate of change is compared with the reference rate to obtain an error value which is used to adjust the actual rate of temperature change so that it continually conforms to the selected reference. This is accomplished by using the least value gate and its related controls to translate the error value into control signals to the damper motor, which moves the damper to a more open or more closed position as the case may be. Absent any transient conditions, the temperature rate controller is the principal control system in operation until the steam pressure in the system reaches normal operating levels.

Transient conditions during start-up, which are principally reflected by drum level surge problems, may cause a drum level control subsystem to override the temperature rate controller. Two drum parameters, pressure and water level, are measured and converted into a drum level reference signal and a drum level pressure constant, respectively. These two signals are then combined to produce an output signal called a drum level control signal which is sent to the least value gate. If during start-up there is a water level surge in the steam drum that raises the water above a preselected level, the drum level control signal to the least value gate will be lower than that from the temperature rate controller. Under such circumstances, the least value gate and its associated components act to move the damper to a closed position. When the drum level problem has been corrected, the temperature rate controller again takes over, and the damper opens again.

Finally, when the HRSG is coming on-line, a steam turbine load controller acts to control the damper position. This load controller monitors the steam turbine and generates a reference signal which is eventually fed to the least value gate. Depending on the magnitude of the signal, the dampers may be adjusted thereby changing the steam flow rate so that the system generates steam at the rate required for proper loading of the turbine.

DRAWINGS

We turn now to a description of the preferred embodiment after first briefly describing the drawings.

FIG. 2 is a block diagram of a control system of this invention;

Figure 6A:
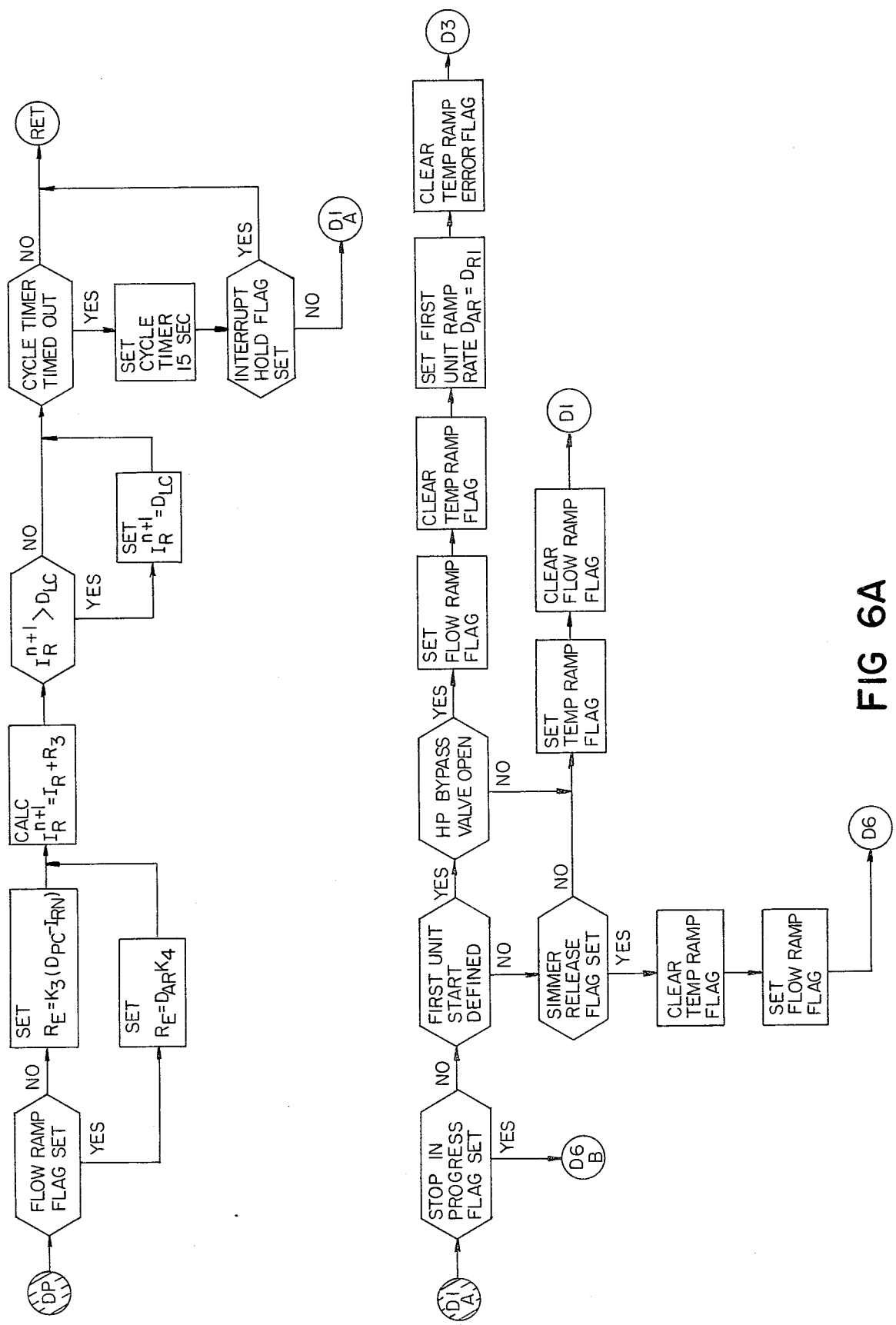
Figure 6B:
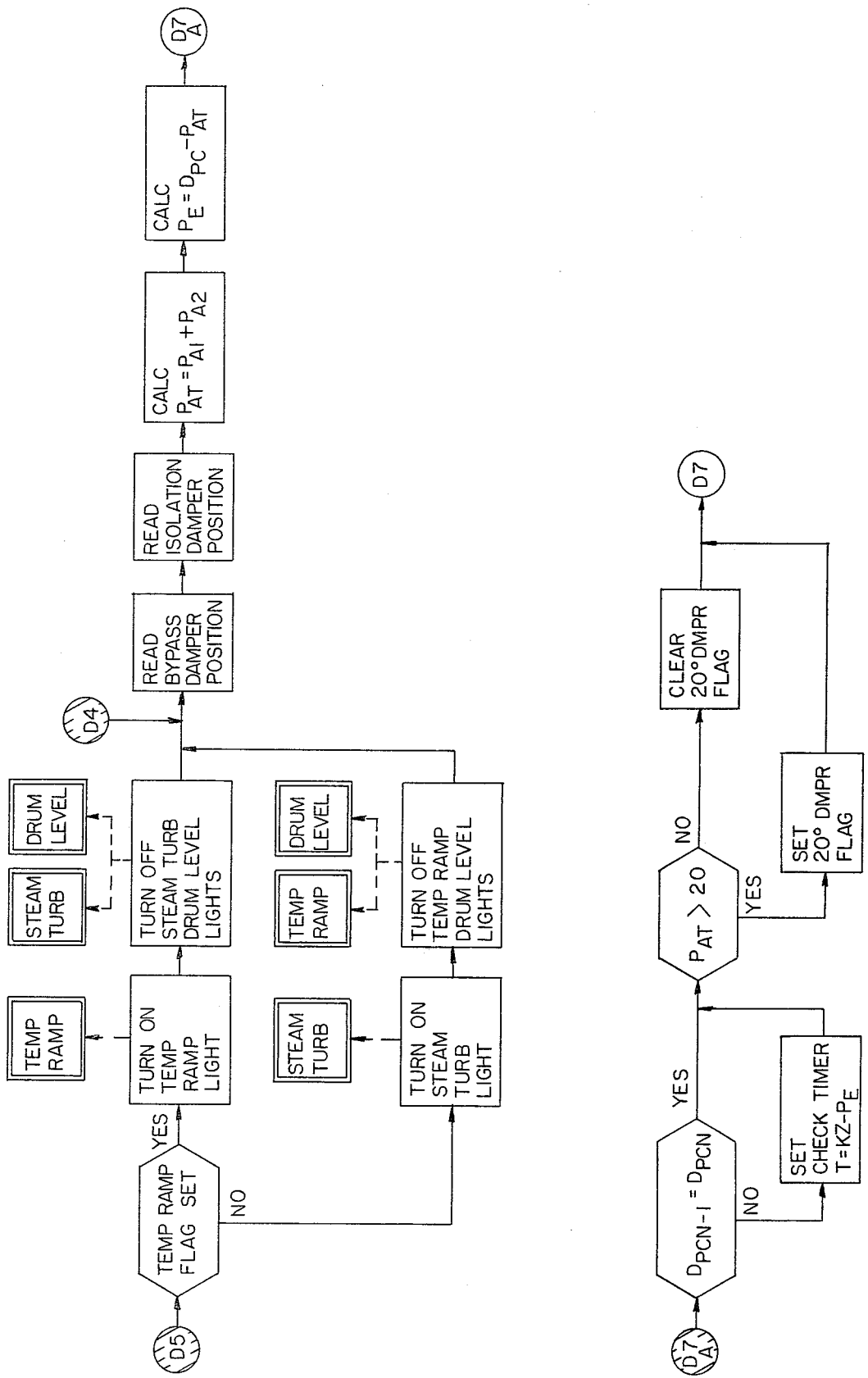
Figure 6C:
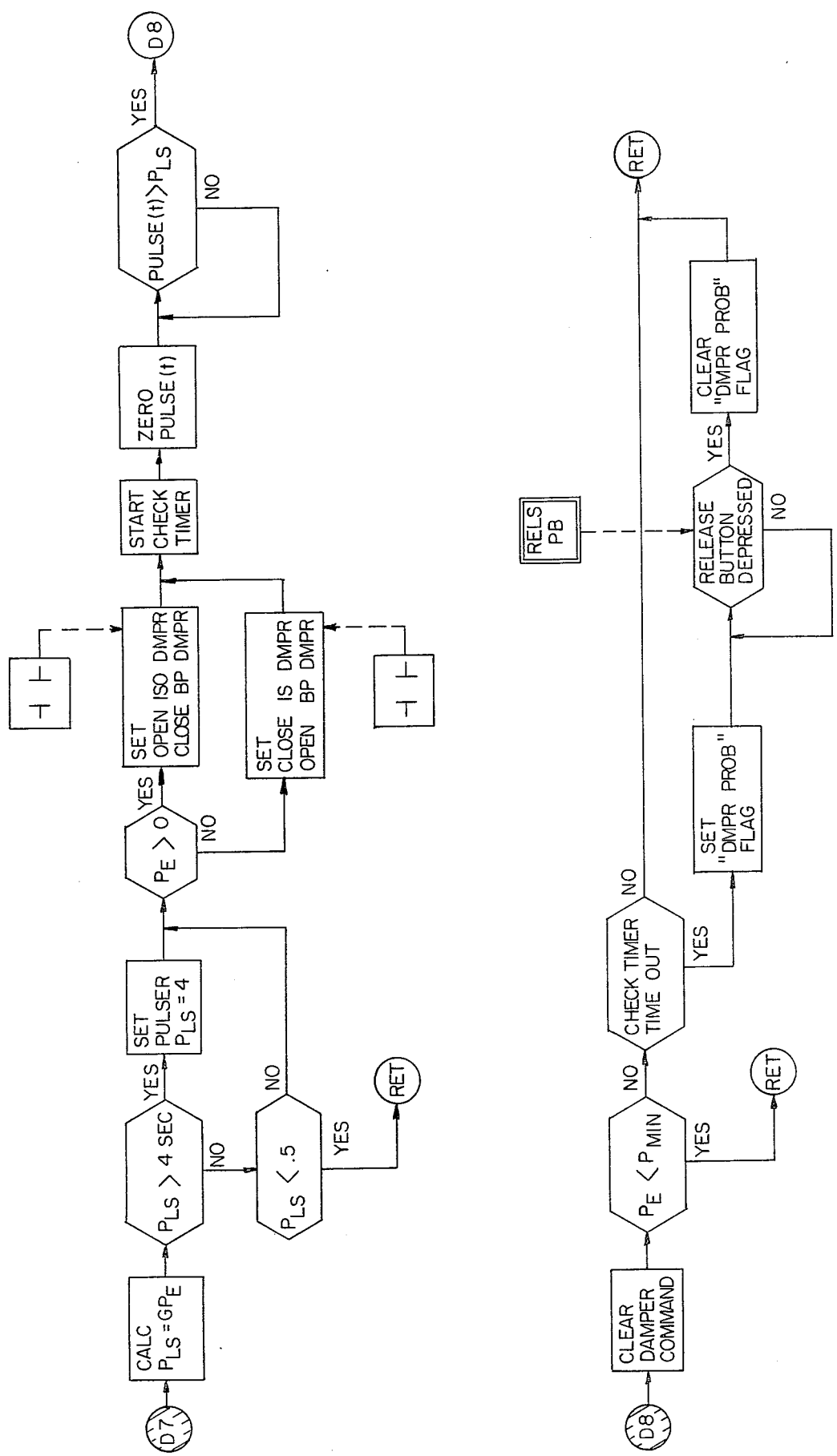
Figure 6D:
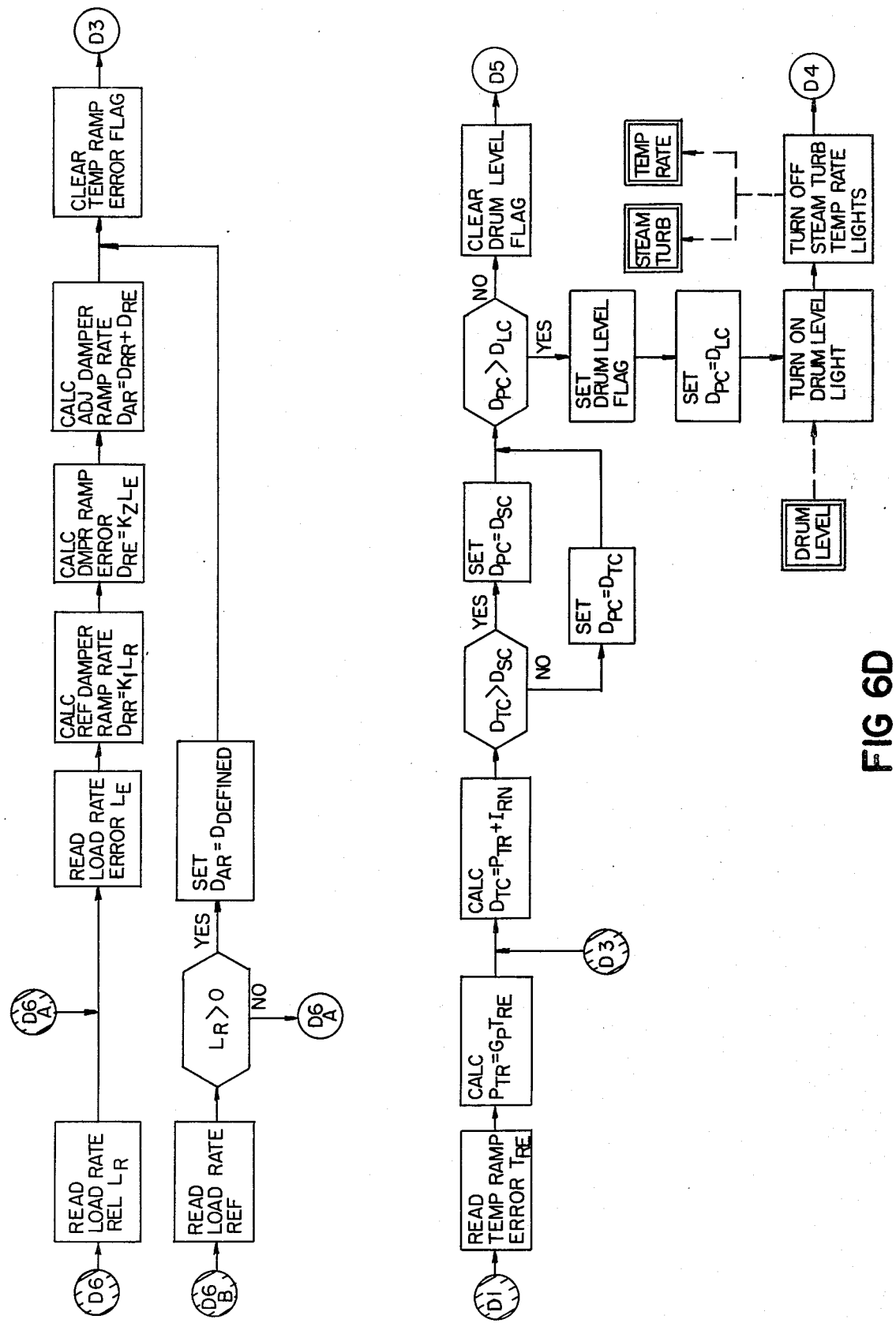

FIGS. 6(A) (B) (C) and (D) is a flow chart of the program used with the microprocessor of the preferred embodiment.

DESCRIPTION OF THE PREFERRED EMBODIMENT

Figure 1:
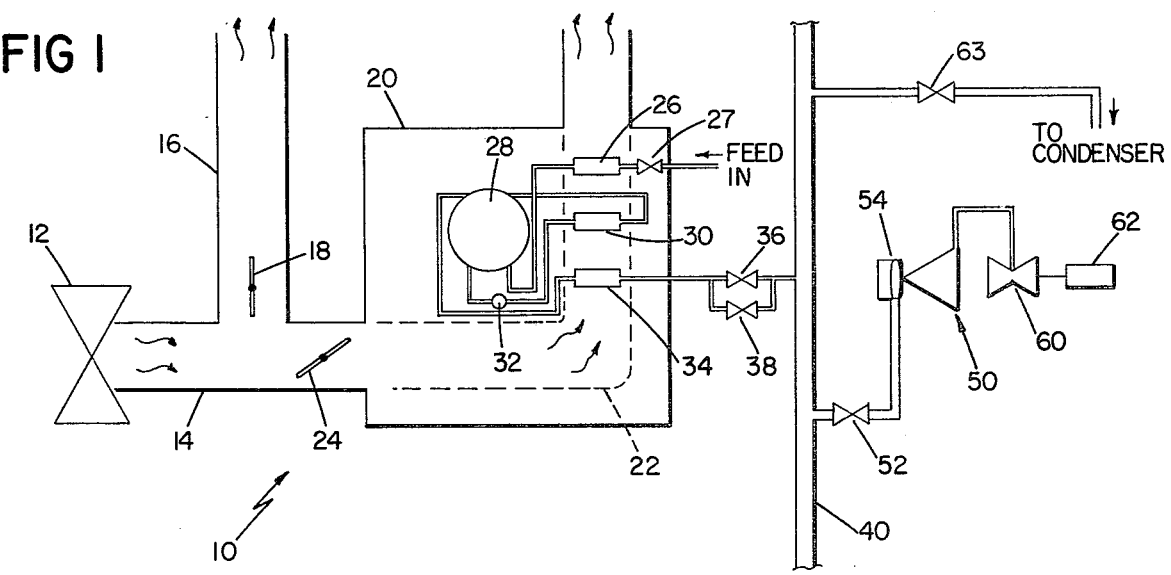
FIG. 1 is a generalized block diagram of a combined cycle power plant.

Referring to FIG. 1, the basic steam turbine system for a combined cycle power plant is shown at 10. The system 10 generally comprises a series of HRSGs 20 (only one shown), all of which feed a main steam header 40 which is connected to a steam turbine 50.

More specifically, a gas turbine 12, when it is operating, vents its hot exhaust gas through a conduit 14. The conduit 14 is connected to an exhaust stack 16, which vents into the atmosphere, and to a heating stack 22, which passes through the HRSG 20. A bypass damper 18 controls the gas flow through the exhaust stack 16, and an isolation damper 24 controls the flow to the heating stack 22. The dampers 18, 24 are motor controlled, and interlocks prevent any movement of either damper unless the other damper is completely opened. (The bypass damper 18 is shown completely opened in FIG. 1 so any positioning of the isolation damper 24 would be possible and not just the partially open position shown.)

The HRSG 20 has several elements mounted in the heating stack 22. An economizer 26 is at the top of the stack 22. An evaporator 30 is mounted in an intermediate position, and a superheater 34 is in the lowest and hottest portion of the stack 22. In operation, feedwater flows through a feedwater control valve 27 into the economizer 26 where it is heated by the hot exhaust gas flowing through the stack 22, and the heated water is fed to a steam drum 28. A circulating pump 32 draws water from the steam drum 28 into the evaporator 30. At start-up, the evaporator 30 is filled with water. The exhaust gas heat turns some of the evaporator water into steam, and steam and water is fed back into the top of the steam drum 28. Steam from the drum 28 flows from the drum to the superheater 34, and superheated steam flows to the main steam header 40 through an isolation valve 36 and a bypass valve 38. Basically, the amount of steam flow is proportional to the amount of gas flow as determined by the positions of the isolation damper 24 and the bypass damper 18. (The HRSG system has a number of associated pieces of equipment not shown here. They are, however, shown and described in Wagner et al., U.S. patent application Ser. No. 187,153, filed Sept. 15, 1980, incorporated herein by reference.)

The steam header 40 is connected to the high pressure and low pressure steam turbines 50, 60 through a main stop valve 52 and a main control valve 54. Header 40 is also connected to a bypass valve 63. The turbines 50, 60 run a generator 62.

At start-up, all of the HRSGs are usually started, and one of the HRSGs is selected as the first unit to be placed on-line with full output. This HRSG is brought up as quickly as possible to the initial setpoint pressure (400 psig), measured at the steam turbine bypass valve 63. The other HRSGs are all brought up to a simmer flow, (about 10% of rated output but also at 400 psig), whereby, when required by the start-up program, they can rapidly be brought on-line to contribute their full steam output to the main steam header 40. The specific start-up problems that arise will be discussed hereinafter in more detail.

Referring to FIG. 2, a control system of this invention is shown at 100. The control system 100 generally comprises three control subsystems, a temperature rate controller 110, a drum level/simmer mode controller 130 and a steam turbine load controller 170, all of which control the position of the bypass and isolation dampers 18, 24 through a damper position control 200.

The basic damper motor control 200 comprises a least value gate 202, which produces a damper command signal $D_{PC}$. The $D_{PC}$ command signal is fed to a summing junction 204. The function of the summing junction 204 is to determine the difference between the actual position of the isolation and bypass dampers and the required damper position represented by the damper command signal $D_{PC}$. This is accomplished in the following manner. Feedback lines 206 and 208 from the respective dampers carry signals representing the actual damper positions ($P_{A1}$ for the isolation damper 24 and $P_{A2}$ for the bypass damper 18) to the summing junction 204. The summing junction 204 compares these signals, $P_{A1}$ and $P_{A2}$, to the damper command signal $D_{PC}$. The result or summing junction output is a damper position error signal $P_E$ from the junction 204. The error signal $P_E$ is fed to damper positioners 210, 212, which respectively control the movements of the isolation damper 24 (shown partially open in FIG. 2) and the bypass damper 18 (shown open in FIG. 2).

The damper positioners 210, 212, convert the error signal $P_E$ into a running time for the damper motors (not shown) proportional to $P_E$. For each 15 second interval, the running time is a minimum of 0.5 seconds and a maximum of 4.0 seconds. As the dampers slew at a rate of 6°/second, the angle change, presuming the dampers are not initially in the correct position, is from 3° to 24° for each 15 second interval. Accordingly, as 3° is the minimum change, there is some inaccuracy for very small corrections, but the inaccuracy is not significant during operation.

Figure 3:
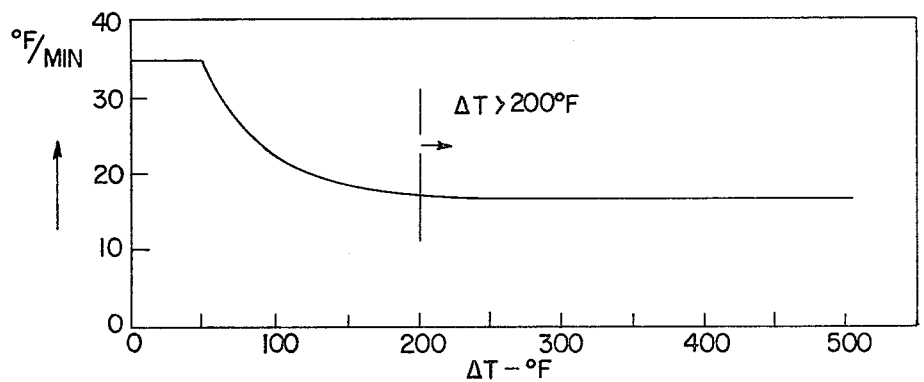
FIG. 3 is a graph of a cyclic damage curve defining the maximum rate of temperature change of a steam drum for any rate of change in drum water temperature.

At start-up, the equipment could be cold, at ambient conditions, or it could be pressurized at saturation conditions. A hot pressurized start, however, is the more usual situation, as it represents the state of the equipment following an overnight shutdown, and it presents the most problems in terms of steam drum surge. For a cold start, isolation damper 24 is opened partially, and the equipment, particularly the apparatus inside the HRSG heating stack 22, begins to heat up. The bypass damper 18 is fully open, and the bypass valve 38 to the main steam header 40 is opened. There is a limit to the rate at which the water temperature in the steam drum 28 can be increased without causing undue thermal stress in the drum and other equipment. This rate is reflected by the graph of FIG. 3, and it varies, depending upon the initial temperature of the water in the drum. In order to keep the rate of temperature change within acceptable limits without unduly slowing the start of the unit, the temperature rate controller 110 controls the isolation damper 24 position through the damper motor control 200. Unless overridden, the temperature rate controller 110 is the primary damper control during start-up.

As shown in FIG. 2, the temperature rate controller 110 receives an analog temperature signal $T_D$ from the steam drum 28 (FIG. 1). Temperature signal $T_D$ represents the temperature of the water in the drum, and it is sensed by conventional methods. At start-up, the initial drum water temperature is sensed, and based on that value, a maximum rate of temperature change or reference rate $T_R$ is selected from the graph of FIG. 3. (For a cold start, the rate $T_R$ is usually 15° F./min. For intermediate temperatures, $T_R$ may be as much as 35° F./min.) At specific intervals thereafter, which in the preferred embodiment is a relatively short period of time, a new temperature signal $T_D$ is generated. Each $T_D$ signal is sent to a temperature rate calculator 112. Calculator 112 compares the $T_D$ signal (representing current drum water temperature) with the last previously-received $T_D$ signal, and based upon the difference therebetween, computes the actual rate of change in °F./sec. This actual rate of change signal $T_A$ is sent to a summing junction 114. Summing junction 114 also receives as an input the reference rate $T_R$. The difference between the selected and the actual rates is a rate error signal $T_{RE}$, which is the output of the temperature rate controller 110. The error signal is fed to the damper position motor control 200 and eventually to the least value gate 202 to produce the damper control signal $D_{PC}$ thereby opening the isolation damper 24 to increase the rate of temperature rise or closing it to decrease it, so that the actual rate of temperature change follows the selected one.

Specifically, the temperature rate error signal $T_{RE}$ is sent to a track and hold function 214 of the damper control 200. The track and hold 214 passes the signal to an amplifier 216, which multiplies the signal by a gain factor to produce a larger signal, which is still proportional to $T_{RE}$. That amplifier signal $P_{TR}$ is fed to a summing junction 218, the output of which is the temperature ramp control signal. The temperature ramp control signal $D_{TC}$ is not just a function of $P_{TR}$, however. Another input for summing junction 218 is from a reset integrator 220. The reset integrator continually varies its output until the actual temperature rate $T_A$ is equal to the desired rate $T_R$. In this state, $P_{TR}$ is zero and the output of the summer 218, $D_{TC}$, will be equal to the output of the reset integrator 220. As long as $D_{TC}$ is the low value entering the least value gate 202, the output of summer 222 will be zero and the reset integrator will be in a quiescent state. If $D_{TC}$ is the low value to the least value gate 202, the output $D_{PC}$ from the gate will be a function of $D_{TC}$. That output $D_{PC}$ changes the damper position so that the selected rate of change $T_R$ is maintained. Therefore, the thermal stresses are automatically limited.

Although the temperature rate controller 110 would otherwise control the damper positions during start-up, certain transient conditions are created during start-up which must be compensated for. For example, when the start cycle begins, the steam drum contains a quantity of water, normally about seven inches below the drum centerline. The evaporator 30 is full of water at this time, and when the damper 24 opens, the water in the evaporator begins to boil. This boiling will not be uniform, and steam may be generated at various locations inside the evaporator 30. This will displace large slugs of water into the steam drum 28 thereby raising the drum's water level. This drum water level surge may be up to 20 inches or more, and is very undesirable, as it may force water into the superheater 34 with potential entry into the turbine itself. The drum level/simmer mode controller 130 prevents this.

The drum level/simmer mode controller 130 has two separate portions, a drum level controller 132 and a simmer mode controller 150. Only the drum level controller 132 is involved in the drum surge problems. The drum level controller 132 receives two analog signals from the steam drum 28. $D_L$ represents the steam drum water level, and $P_D$ represents the steam drum pressure. The drum level signal $D_L$ is sent to a limiter 134 which produces a drum level override signal $D_{LO}$, and it varies linearly with changes in drum level between two and thirteen inches above the normal water line. The actual value of $D_{LO}$ for this range is:

$$D_{LO} = -0.091 D_L + 4.46$$

(In the drum of the preferred embodiment, normal drum level is about 36 inches.) For drum levels less than 2 inches above normal, $D_{LO}$ has a value of one. For drum levels more than 13 inches above normal, $D_{LO}$ has a value of zero. The $D_{LO}$ signal is then sent to a multiplier 136.

The pressure signal $P_D$ is also sent to a limiter 138 which produces a drum level pressure constant $D_{PL}$. The $D_{PL}$ signal also varies linearly with actual drum pressure between 14.7 and 240 psia. For this range, the actual value of $D_{PL}$ is:

$$D_{PL} = 0.67 P_D + 21.67$$

For pressures below 14.7 psia, $D_{PL}$ has a value of 32, and for pressures above 240 psia (at which drum surge is no longer a problem), $D_{PL}$ has a value of 180. These values represent, in degrees, the amount of damper movement [isolation closed, bypass open (zero gas flow), and 180° being isolation open, bypass closed (full gas flow through HRSG)].

Figure 4:
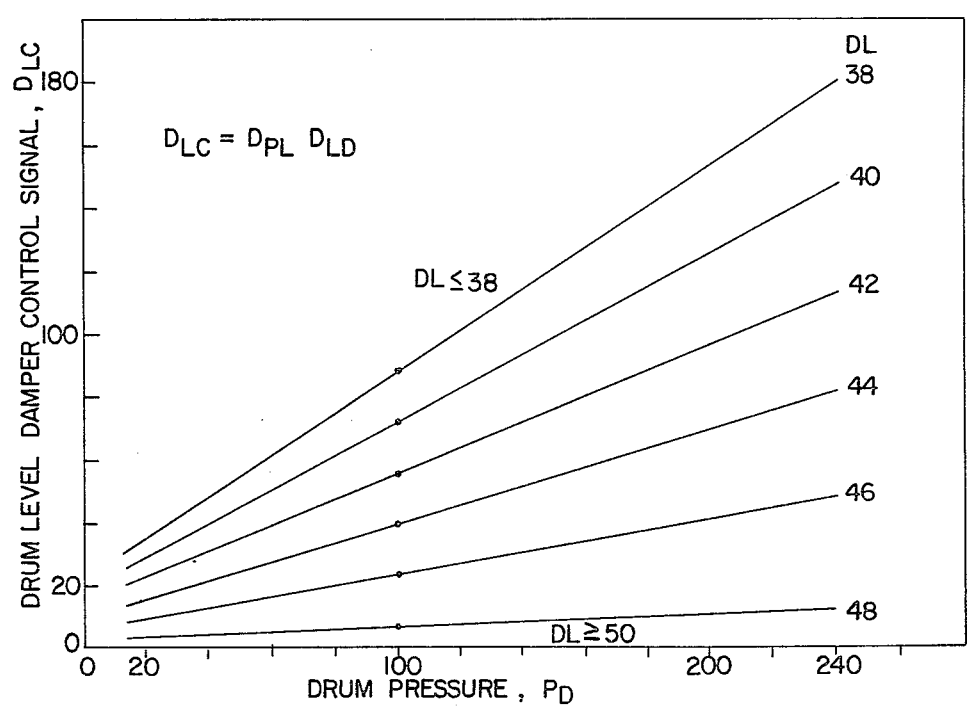
FIG. 4 is a graph of drum pressure, drum level and damper control.

The $D_{PL}$ signal is also sent to multiplier 136 where it is multiplied with $D_{LO}$. The product is a drum level damper signal $D_{LC}$ which is fed to one input of the least value gate 202. The graph of FIG. 4 shows the relationship between drum level, drum pressure and the damper location. For example, for a drum pressure $P_D$ of 100 psia, the damper angle (y-axis) is from 0° to about 89°, depending on the drum level $D_L$. The lower the drum level $D_L$, the higher the damper angle, which means more gas flow through the HRSG if required by the temperature rate control 110.

If a drum water level surge exists, $D_{LC}$ will drop proportionally. When $D_{LC}$ falls below all of the other inputs to the least value gate 202, the output of the least value gate $D_{PC}$, the damper position command signal, is based on $D_{LC}$. Thus, the proper damper adjustment will be automatically made so that the surge problem is limited, to maintain drum water level below the high level alarm point. When the high level condition diminishes, $D_{LC}$ will rise in value, and the temperature rate controller 110 will again take over damper control through the least value gate 202.

The simmer mode portion 150 of the drum level/simmer mode controller 130 involves the determination of whether or not the particular HRSG is the first unit started. As previously explained, if the HRSG is the first one started, it is brought up to full output. Subsequently started HRSGs are brought to a simmer state, which is about 10% of rated output. The simmer mode portion 150 maintains an HRSG in a simmer state by modulating the damper position to hold the HRSG output flow at the simmer level.

When the HRSG is operating at simmer, there is a specific differential pressure $dP_R$ across the bypass valve 38 to the main steam header 40. This pressure is used as a reference value and compared at summing junction 152 with the actual pressure $dP_A$ across the valve. If the resulting value is positive, meaning that HRSG steam flow is less than 10%, switch 154 adds a positive value K to the simmer setpoint integrator 156. If the value is negative, meaning that HRSG steam flow is greater than 10%, the switch 154 subtracts the K value. The integrator output, $I_S$, is sent to summing junction 158 which also receives a simmer reference position signal $S_R$. $S_R$ is equivalent to an isolation damper angle of about 20°, which is the usual angle for an HRSG in simmer mode. The summation of the two signals $I_S$ and $S_R$ yields the damper control signal $D_{SC}$ which represents a small damper angle change dependent upon the differential pressure across the bypass valve. The actual differential pressure is updated every 15 seconds. The signal $D_{SC}$ is sent to one pole 160 of switch 162. The other pole 161 of the switch 162 receives a simmer off reference value $S_{RO}$. Depending upon the state of the switch 162, either $S_{RO}$ or $D_{SC}$ will be sent to an input of the least value gate 202.

If the HRSG is operating in a simmer mode, $D_{SC}$ is sent to the least value gate, and it controls the dampers, unless the temperature rate controller 110 or the drum level control require less gas flow. $D_{SC}$ then controls the position of the isolation damper 24 so that it varies its angle around the 20° normal for simmer mode operation. As explained, the variation depends upon the actual differential pressure across the bypass valve. If this differential pressure is too low, the damper angle is increased. If the differential pressure is too high, the angle is reduced. When it is desired to bring the HRSG to full output, switch 162 sends the $S_{RO}$ signal to the least value gate and the damper 24 position limit imposed by the simmer control 150 is removed.

The steam turbine load controller 170 controls the dampers through the least value gate 202 and regulates the rate of change of steam generation for subsequent HRSGs when they are released from simmer mode and begin delivering additional steam with the turbine in the boiler-following mode. Controller 170 receives an analog signal $L_T$ from the generator 62 driven by the steam turbine 50. This signal is fed to a summing junction 172, which is connected in a feedback loop with an integrator 174. The output from summing junction 172 is a load rate signal $KW_A$. This load rate signal $KW_A$ is compared at a second summing junction 176 with a load rate reference signal $KW_R$ to produce a load rate error signal $L_E$, which is the difference between the two. When the actual load rate and the reference load rate coincide, $L_E$ has a value of zero. Both the load rate error signal $L_E$ and the reference signal $KW_R$ are the outputs of the controller 170, and both are sent to the damper control 200. Initially, both are fed to separate multipliers 232, 234, the outputs of which go to a summing junction 236. Multiplier 232 converts the reference turbine loading rate, which is in kilowatts/minute, to an approximate, equivalent damper movement rate. The signal is then corrected for errors in the actual loading rate, and the summing junction 236 produces an adjusted damper rate signal $D_{AR}$ which is fed to one pole of a first unit switch 238. Switch 238 provides for a different start-up program in the case of the first HRSG to start so that it will deliver full steam output prior to the turbine transferring to the boiler-following mode.

Depending upon the status of switch 238, either $D_{RI}$ or $D_{AR}$ is fed to a multiplier 239, the output of which is connected to a second pole 229 of switch 226. As previously explained, the other pole 228 of switch 226 receives the $D_{PC}$ signal from the least value gate 202 through summing junction 216 and multiplier 224. The output from the switch 226 is fed to the reset integrator 220, and the output $I_R$ goes back to summing junction 218 where it is added to the temperature rate signal $P_{TR}$ from the temperature rate controller 110. When the HRSG is transferred to load control, the output of switch 238 is transmitted through multiplier 239 and switch 229 to the reset integrator 220, and the temperature rate signal, $P_{TR}$, is held at its last value. A limit 230 is placed on the value of the reset integrator output $I_R$. This limiting value prevents the integrator output from obtaining excessively high values when starting an HRSG. During cold starts, there is a significant lag between the initial opening of the isolation dampers and a measurable increase in drum water temperature because of the thermal capacitance of HRSG duct walls, the evaporator and superheater tube walls. The limiting control 230 prevents this lag from driving reset integrator outputs too high. Once the system is responsive to temperature rate changes which is assumed at some temperature above saturation, this prewarm limit is not invoked.

If the HRSG is the first unit started, it is brought to full steam output as quickly as possible. In this case, switch 238 sends the load rate reference signal $D_{RI}$, which corresponds to the maximum rate permitted by the HRSG, to the reset integrator 220. All of the steam generated by the first HRSG initially bypasses the turbine through the bypass valve 53, so the start-up time of the first boiler is not limited by the amount of steam the turbine can take at start-up. Once under flow control, however, switch 238 sends the $D_{AR}$ signal to the integrator 220 (switch 226 being set to second pole 229). As a result, when the reference load rate $KW_R$ and the actual load rate $KW_A$ are unequal, $D_{AR}$ is increased or decreased by the amount of load rate error $L_E$, and the output $I_R$ of reset integrator 220 changes accordingly. This output $I_R$ is summed with the temperature rate signal $P_{TR}$, which is used as a reference signal in this mode, and the result is $D_{TC}$, which controls the least value gate 202 and, thus, damper position. Accordingly, there is a proportional change in the amount of steam generated according to the load requirements.

Figure 5:
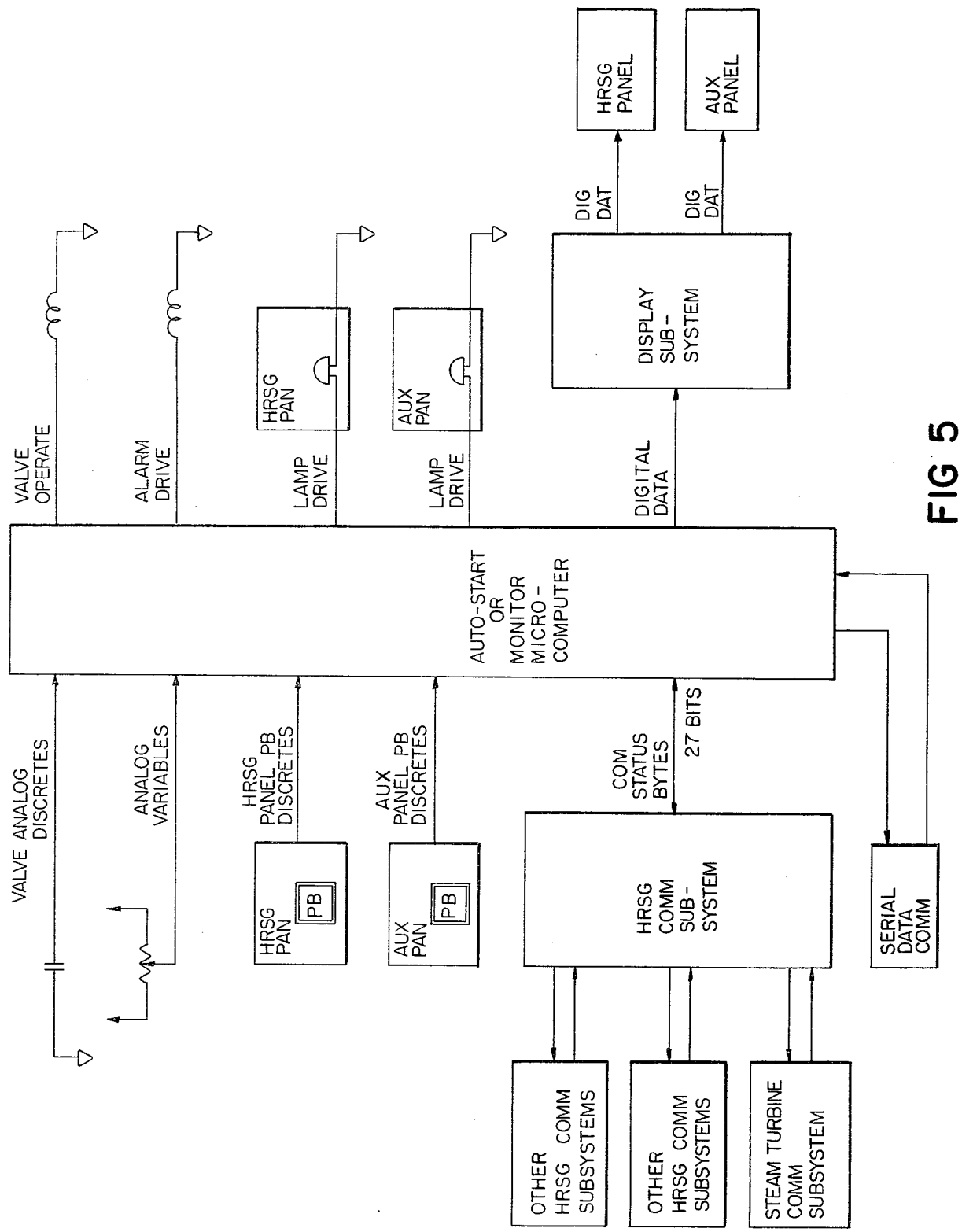
FIG. 5 is a block diagram of the microprocessor system of this invention.

The actual operation of the control system in the preferred embodiment is controlled by a microprocessor 300, which is an 8085 Intel, the basic configuration of which is shown in the block diagram of FIG. 5. The program used in the preferred embodiment is a routine program, the flow chart of which is produced in FIGS. 6A, B, C and D.

Other variations may be made in the preferred embodiment which are within the scope of the claims. One such variation includes the use of the present invention in conjunction with two or more gas turbines and two or more HRSGs as is shown in U.S. patent application Ser. No. 187,153 to Wagner et al. and incorporated herein by reference.

What is claimed is:

1. An apparatus for controlling the operation of a steam turbine system for a combined cycle power plant comprising:
   a damper control,
   a temperature rate controller, and
   a drum level controller,
   said damper control comprising means for receiving a first signal from said temperature rate controller and a second signal from said drum level controller, and means for producing a control signal based on either said first or second signal,
   said control signal being fed to damper positioner means which adjusts the angle of a damper control system including an isolation damper and a bypass damper for an HRSG based on the value of said control signal.

2. The apparatus of claim 1 wherein said means for receiving comprises a least value gate.

3. The apparatus of claim 1 wherein said means for producing comprises a summing junction.

4. The apparatus of claim 3 wherein said summing junction receives feedback signals representing the actual position of said dampers, and compares said feedback signals with a signal from said means for receiving to produce said control signal.

5. The apparatus of claim 4 wherein said damper positioner which moves said dampers in response to said control signal.

6. A damper control system for an HRSG in a power plant which includes at least two gas turbines each providing hot exhaust gas to an associated HRSG, said HRSGs each being connected to a common steam header which is connected to a steam turbine, said control system comprising:
   a temperature rate control providing a first damper control signal;
   a drum level simmer mode control providing a second damper control signal corresponding to drum pressure and level; said drum level simmer mode control also providing a third damper control signal;
   least value logic receiving said first, second and third signals to provide a damper position signal corresponding to the lowest control signal; and,
   a load control providing a fourth damper control signal to replace said first damper control signal whenever the HRSG is in flow control.

7. The damper control system recited in claim 6 wherein the drum level simmer mode control includes:
   first switching means providing an output signal to indicate HRSG output above or below a simmer level;
   a simmer setpoint reference combined with said first switching means output to provide a simmer control signal;
   second switching means receiving said simmer control signal and a damper wide open signal whereby said third damper control signal is selected.

8. The damper control system recited in claim 6 further comprising track and hold circuitry for said first damper control signal and wherein the load control includes:
   means for generating a load rate signal;
   first switching means for selectively applying the load rate signal to the first damper control signal which is held at the last update value in the track and hold circuitry at the time the first switching means is actuated whereby the first damper control signal is replaced by the fourth damper control signal based on the load control output.

9. The damper control signal recited in claim 8 further comprising a second switching means upstream from the first switching means whereby a load rate signal is selected from either the load rate error signal or a first unit program.

10. A damper control system for an HRSG in a power plant which includes at least one gas turbine providing hot exhaust gas to an associated HRSG, said HRSG connected to a steam turbine, said control system comprising:
   a temperature rate control providing a first damper control signal;
   a drum level simmer mode control providing a second damper control signal corresponding to drum pressure and level; said drum level simmer mode control also providing a third damper control signal;
   least value logic receiving said first, second and third signals to provide a damper position signal corresponding to the lowest control signal; and,
   a load control providing a fourth damper control signal to replace said first damper control signal whenever the HRSG is in the flow control.

* * * * *